United States Patent
Goetsch et al.

(10) Patent No.: US 8,778,038 B2
(45) Date of Patent: *Jul. 15, 2014

(54) METHOD FOR CONTROLLING THE PEAK TEMPERATURE OF A FLUID GASIFICATION ZONE

(75) Inventors: Duane A. Goetsch, Andover, MN (US); Jacqueline R. Hitchingham, Anoka, MN (US); Lloyd R. White, Minneapolis, MN (US)

(73) Assignee: Syngas Technology, LLC, Elk River, MN (US)

( * ) Notice: Subject to any disclaimer, the term of this patent is extended or adjusted under 35 U.S.C. 154(b) by 197 days.

This patent is subject to a terminal disclaimer.

(21) Appl. No.: 13/371,282

(22) Filed: Feb. 10, 2012

(65) Prior Publication Data

US 2012/0196238 A1 Aug. 2, 2012

Related U.S. Application Data (63) Continuation-in-part of application No. 12/767,546, filed on Apr. 26, 2010, now abandoned.

(60) Provisional application No. 61/214,482, filed on Apr. 24, 2009, provisional application No. 61/270,645, filed on Jul. 10, 2009, provisional application No. 61/295,355, filed on Jan. 15, 2010.

(51) Int. Cl.
C10J 3/46 (2006.01)

(52) U.S. Cl.
USPC ............. 48/197 R; 48/61; 48/76; 48/116; 48/117; 48/63; 48/86 A; 48/62 A; 48/198.6; 48/203; 48/212; 48/213; 422/139

(58) Field of Classification Search
USPC ........... 48/197 R, 61, 76, 116–117, 63, 86 A, 48/62 A, 198.6, 203, 212–213; 422/139
See application file for complete search history.

(56) References Cited

U.S. PATENT DOCUMENTS

| | | | |
|---|---|---|---|
| 5,059,404 A | 10/1991 | Mansour | |
| 5,306,481 A | 4/1994 | Mansour | |
| 6,613,111 B2 | 9/2003 | Paisley | |
| 6,680,137 B2 | 1/2004 | Paisley | |
| 7,842,110 B2 * | 11/2010 | Mansour et al. | 48/197 R |
| 2004/0031450 A1 * | 2/2004 | Chandran et al. | 122/24 |
| 2010/0269411 A1 * | 10/2010 | Goetsch et al. | 48/204 |
| 2010/0270506 A1 * | 10/2010 | Goetsch et al. | 252/373 |
| 2012/0193581 A1 * | 8/2012 | Goetsch et al. | 252/373 |

FOREIGN PATENT DOCUMENTS

JP 403199811 * 8/1991

* cited by examiner

*Primary Examiner* — Kaity Handal
(74) *Attorney, Agent, or Firm* — Henry E. Naylor (57) ABSTRACT

A method for controlling the peak temperature of a fluid gasification zone used for the gasification of carbonaceous materials to a syngas. Pulsed oxygen is used to control the peak temperature of the gasification zone and to avoid hot spots in the gasifier.

9 Claims, 3 Drawing Sheets

Simplified Drawing showing Sequencing of Pulsed $O_2$

D - Shroud around each nozzle

E - Passage of cooler solids and gas into jet $S_G$ - Gap between nozzle and shroud (optional)

$h_N$ - Height of nozzle above constraining wall or nozzle support $d_N$ - Nozzle diameter

Figure 3

METHOD FOR CONTROLLING THE PEAK TEMPERATURE OF A FLUID GASIFICATION ZONE

CROSS REFERENCE TO RELATED APPLICATIONS

This application in a continuation-in-part of U.S. Ser. No. 12/767,546 filed Apr. 26, 2010, now abandoned, which claims benefit of Provisional Applications 61/214,482 filed Apr. 24, 2009; 61/270,645 filed Jul. 10, 2009; and 61/295,355 filed Jan. 15, 2010.

FIELD OF THE INVENTION

The present invention relates to a method for controlling the peak temperature of a fluid gasification zone used for the gasification of carbonaceous materials to a syngas. Pulsed oxygen is used to control the peak temperature of the gasification zone and to avoid hot spots in the gasifier.

BACKGROUND OF THE INVENTION

Gasification is a process that converts carbonaceous materials, such as coal, petroleum, or biomass to predominantly carbon monoxide and hydrogen (syngas) by reacting the carbonaceous material at high temperatures under gasification conditions. Syngas may be burned directly in internal combustion engines, used to produce methanol, dimethyl ether, or hydrogen, or converted via the Fischer-Tropsch process into synthetic fuels. Syngas can also be used to produce other products.

Gasification of fossil fuels is currently widely used to generate electricity. A wide variety of carbon-containing material can be used as the feedstock for gasification, including biomass and plastic waste. Thus, gasification has the potential to be an important technology for renewable energy, and is generally carbon neutral.

Since gasification is an endothermic reaction, heat must be supplied to the carbonaceous material either indirectly through exchange with a hot heat transfer surface or directly through the simultaneous heat release associated with partial oxidation due the introduction of oxygen-containing gas into the reactor. Most carbonaceous material derived from biomass contain significant amounts of inorganic material (i.e. silica, potassium and other elements) that do not undergo gasification and can agglomerate and fuse into a phase commonly referred to as slag when exposed to elevated temperatures (typically >1800 F.). Gasifiers that are designed to minimize slag formation and use partial oxidation to generate the required thermal energy for gasification (directly heated gasifiers) must control the addition of oxygen in order to avoid excessive temperatures within the partial oxidation zone.

The direct injection of oxygen or air into a gasifier chamber typically leads to high temperatures within the gas jet region associated with the nozzle or injection device used to introduce the oxygen. Examples of conventional gasifier designs, or systems, are described in U.S. Pat. Nos. 6,613,111 and 6,680,137 which utilize two fluid bed reactors, each containing a bed of fluidized inert (circulating) and carbonaceous solids. Gasification occurs within one bed (first fluidization stage) and the solids stream comprised of an inert fluidization solids fraction and a carbonaceous (carbon-rich) fraction are collected and routed to a second fluid bed (typically a combustion stage) where they undergo oxidation to raise the temperature of the fluidization solids. The heated inert solids are then sent back to the gasifier section (first stage) supplying heat to the gasification stage. In this type of design, the amount of heat generated in the combustion stage is critical since it must be sufficient to maintain the desired gasification temperature. If the rate of oxidation is excessive (too much carbonaceous material with air), the solids may undergo an unacceptably high temperature rise, resulting in either slag formation which can lead to loss of fluidization or the volatilization and redeposition of undesired inorganic material in the colder sections of the process unit, such as in gas conduits. Conversely, operating the combustion stage at lower than desired temperatures can lead to the accumulation of carbonaceous material in both the gasification and combustion stages of the gasifier system.

Either full or partial oxidation of the carbonaceous material within the second stage can occur. The most important objectives in the combustion stage include the removal of carbonaceous material to prevent accumulation and to generate an effective amount of thermal energy to drive the gasification reactions.

Gasifier designs based on indirect heating by use of hot heat transfer surfaces are best represented by U.S. Pat No. 5,059,404, U.S. Pat. No. 5,306,481 and related patents. In such gasifier systems, the heat required for driving the gasification reactions occurs by use of hot heat transfer tubes located within the fluidized bed.

While there is much activity in the field of gasification, especially for converting biomass to fuel products, there is still a need in the art for improved and more efficient processes and equipment.

SUMMARY OF THE INVENTION

In accordance with the present invention there is provided a process for converting carbonaceous materials to a syngas in a gasification process unit, which process comprising:

A method for controlling the temperature of a gasification zone having a top section and a bottom section and which is designed for converting carbonaceous materials, having an inorganic fraction and an organic fraction, to a syngas:

a) maintaining a fluidized bed of solids in said gasification zone by use of a fluidizing gas introduced through a plurality of nozzles located at the bottom section of said gasification zone wherein said nozzles having a partial oxidation zone and wherein said gasification zone is operated under net reducing conditions;

b) maintaining said fluidized bed at effective gasification temperatures;

c) pulsing oxygen, through one or more of said plurality of nozzles at effective pulsing conditions to maintain the partial oxidation zone of said nozzles below the fusion temperature of at least a fraction of said inorganic fraction of said carbonaceous material.

Also in accordance with the present invention there is provided a process for converting a biomass feedstock to a syngas in a two-stage gasification process unit, wherein the first stage is a fluidized bed gasification stage operated under net reducing conditions and the second stage is a fluidized bed combustion stage operated under net oxidizing conditions, which process comprises:

a) maintaining a fluidized bed of fluidizing solids in said gasification zone by use of a fluidizing gas introduced through at least one nozzle located at the bottom section of said gasification zone wherein each of said at least one nozzle is associated with a partial oxidation zone and wherein said gasification zone is operated under net reducing conditions;

b) maintaining said fluidized bed at a temperature from about 1000° F. to 1800° F.;

c) introducing a carbonaceous feedstock into said fluidized gasification stages, which carbonaceous material is comprised of an organic portion and an inorganic portion into said gasification zone wherein the residence time of said carbonaceous feedstock in said gasification zone is from about 0.1 to about 100 second;

d) pulsing oxygen through one or more of said one or more nozzle at effective pulsing conditions to maintain the partial oxidation zone of said nozzles below the fusion temperature of at least a fraction of said inorganic portion of said carbonaceous material, thereby resulting in a syngas product and a carbon-rich particulate product;

e) conducting at least a portion of said syngas product to a solid/gas separation zone wherein any entrained particulates greater than a predetermined size are separated and returned to said gasification zone and wherein the so-treated syngas product is collected or sent to downstream processing;

f) conducting at least a portion of the fluidizing solids and carbon-rich particulate product from said gasification stage to a fluidized bed combustion stage;

g) introducing, through a second one or more nozzle, an effective amount of a fluidizing gas into said combustion stage thereby resulting in a second fluidized bed;

h) operating said fluidized bed combustion stage at an effective combustion temperature which is at least 50° F. greater than said gasification stage to result in the combustion of at least a fraction of the carbon-rich particulate product from said gasification stage, thereby resulting in a flue gas stream;

i) venting said flue gas stream;

j) returning at least a portion of said fluidizing solids from said fluidized bed combustion stage to said fluidized bed gasification stage; and k) removing any excess solids to maintain a predetermined balance of solids in both stages.

DETAILED DESCRIPTION OF THE INVENTION

This description will enable one skilled in the art to make and use the present invention, and it describes several embodiments, adaptations, variations, alternatives, and uses of the present invention, including what is presently believed to be the best mode of carrying out the invention.

As used in this specification and the appended claims, the singular forms "a", "an", and "the" include plural referents unless the context clearly indicates otherwise. Unless defined otherwise, all technical and scientific terms used herein have the same meaning as in commonly understood by one of ordinary skill in the art to which this invention belongs.

Unless otherwise indicated, all numbers expressing reaction conditions, stoichiometries, concentrations or components, and so forth used in the specification and claims are to be understood as being modified in all instances by the term "about". Accordingly, unless indicated to the contrary, the numerical parameters set forth in the following specification and attached claims are approximations that may vary depending at least upon a specific analytical technique.

Any suitable carbonaceous material (solid, liquid or gaseous) that is capable of being used as a fuel source can be used in the practice of the present invention. Non-limiting examples of such carbonaceous materials include: i) petroleum derived carbonaceous materials such as methane, heavy hydrocarbonaceous oils, heavy and reduced petroleum crude oils, petroleum atmospheric bottoms, petroleum vacuum distillation bottoms, heavy hydrocarbon residues, and asphalt; ii) bitumen, tar sand oil, pitch, and shale oil; iii) natural gas; iv) coals such as lignite, sub-bituminous, bituminous, and antrhracite; v) coal derived materials including coal liquid products obtained from coal liquefaction as well as gaseous products obtained by coal gasification; and vi) biomass, including processed biomass such as torrefied biomass or pyrolysis oil. The carbonaceous feed can also be a mixture of any two or more of the above materials.

A preferred carbonaceous feed is a biomass freed. Any biomass feedstock can be used in the practice of the present invention, Preferred are plant biomass feedstocks, typically referred to as lignocellulosic feedstocks, which are generally comprised of cellulose, hemicellulose, and lignin. Non-limiting examples of plant, or lignocellulosic, feedstocks include non-woody plant biomass, cultivated crops, such as, but not limited to, grasses, for example, but not limited to, C4 grasses, such as switchgrass, cord grass, rye grass, miscanthus, reed canary grass, or a combination thereof, or sugar processing residues such as bagasse, or beet pulp, agricultural residues, for example, soybean stover, corn stover, rice straw, rice hulls, barley straw, corn cobs, wheat straw, canola straw, rice straw, oat straw, oat hulls, corn fiber, recycled wood pulp fiber, sawdust, hardwood, for example aspen wood and sawdust, softwood, or a combination thereof. Further, the lignocellulosic feedstock may include cellulosic waste material such as, but not limited to, newsprint, cardboard, sawdust, and the like. For urban areas, the best potential plant biomass feedstock includes yard waste (e.g., grass clippings, leaves, tree clippings, and brush) and vegetable processing waste. It will be understood that refuse derived fuel (RDF) can also be a biomass feed for purposes of this invention.

Lignocellulosic feedstock can include one species of fiber or alternatively, lignocellulosic feedstock can include a mixture of fibers that originate from different lignocellulosic feedstocks. Furthermore, the lignocellulosic feedstock can comprise fresh lignocellulosic feedstock, partially dried lignocellulosic feedstock, fully dried lignocellulosic feedstock or a combination thereof. In general, the term "biomass" as used herein includes all of the terms, plant biomass, lignocellulosic, cellulosic, and hemicellulosic. It is preferred that the biomass used in the practice of the present invention comprised at least about 30 wt. %, more preferably at least about 50 wt. %. cellulose/hemicelluloses, based on the total weight of the biomass. It is also within the scope of this invention that non-plant biomass be used, a non-limiting example of which is animal manure.

The biomass will typically be dried, then reduced to an effective size for gasification. It is preferred to dry the biomass before size reduction. Technologies for drying such materials are well known in the art and include both passive as well as active drying. Passive drying is preferred for cost considerations, but depending on the nature of the biomass feed passive drying may not be able to reduce the moisture level to a level acceptable for being fed to a gasifier. Therefore, some form of active drying, such as the use of an external heat source and blowers may be needed. It is preferred that the biomass, after drying, contain no more than about 20 wt. %, preferably not more that about 15 wt. %, and more preferably no more than about 10 wt. % water, based on the total weight of the biomass after drying.

An effective size of the biomass feed will depend on whether the biomass is to be sent directly to a gasifier or to pretreatment step, such as torrefaction step. The biomass is subjected to a size reduction step to reduce it a size suitable for gasification in the first stage, or for feed to a torrefaction step. It is preferred that the size reduction step produce a biomass having a particle size of about 0.1 inch to about 3 inches, preferably from about 0.25 inches to 1.5 inches in the case where the biomass it to be pretreated by torrefaction. If the biomass is to be sent directly to a gasifier then it is preferred that the average particle size be from about 1 to 500 microns, preferably from about 150 microns to 300 microns. The fibrous structure of biomass makes it difficult and costly to reduce its particle size. Non-limiting examples of mechanical size reduction equipment include rotary breakers, roll crushers, jet mills, cryogenic mills, hammer-mills, impactors, tumbling mills, roller mills, shear grinders, and knife mills. Hammer-mills are preferred for the practice of the present invention.

It is preferred that the biomass be torrefied after an initial drying and size reduction step. Torrefaction increases the energy density of biomass materials, particularly cellulosic materials, by decomposing the reactive fraction of hemicelluloses. The result is that the energy content per unit mass of torrefied product is increased. Torrefaction of biomass of the present invention is conducted at temperatures from about 390° F. (199° C.) to about 665° F. (352° C.), preferably from about 435° F. (224° C.) to about 610° F. (321° C.), more preferably from about 480° F. (249° C.) to about 575° F. (302° C.). During torrefaction, the biomass properties are changed, which results in better fuel quality for gasification and combustion. Conventionally, torrefaction is usually followed by pelletizing to yield a product that is suitable as a fuel substitute for coal. For purposes of this invention, the torrefied biomass need not be pelletized, but is instead reduced to a particle size that will be suitable for use in a fluid-bed gasifier. This particle size will typically be in the range of about 1 micron to 500 microns, preferably from about 150 microns to about 300 microns. If the biomass is a plant biomass, some of the cellulose in the biomass will undergo hydrolysis and dehydration reactions. The torrefaction process produces a solid biomass product having a higher energy density than the feedstock and a tor-gas.

Torrefaction is also capable producing a relatively uniform pretreated biomass from a wide variety of biomass materials. If desired, the conditions of the torrefaction process can be altered to produce a torrefied product having similar energy content and reactivity as that produced from a completely different biomass feedstock. This has advantages in the design of the gasifier feed system and greatly simplifies the gasifier operation with respect to controlling the $H_2$:CO ratio in the resulting syngas.

Gasifier designs can be broadly grouped into slagging/non-slagging and single or multistage. Non-slagging gasifiers operate at peak temperatures below the fusion temperature of at least a portion of the inorganic constituents contained within the feed stock. Some feed stocks contain inorganic constituents that readily vaporize or form fine particles that become entrained in the gas stream (i.e. silica). Typically, non-slagging gasifiers operate at temperatures below 2000° F. and in many biomass applications must operate below 1600° F. in order to avoid slagging or volatilization/condensation of the inorganic feed constituents. Some biomass gasifier designs incorporate a two stage design since the initial decomposition of the cellulose component involves formation of quantities of carbon-rich materials (commonly referred to as tar, carbon and soot) that react more slowly than other components of the cellulosic feed and thus require longer residence times and/or higher temperatures to completely gasify. This carbon-rich material is typically collected by use of cyclones, or other solid-gas separation methods, and routed to a second stage in which it can undergo partial oxidation, or combustion, to convert substantially all of any remaining organic constituents. Partial oxidation, leads to the generation of additional syngas and generates additional heat to the gasification stage via hot circulating solids. Combustion leads to flue gas as well as hot solids to be returned to the gasifier.

The fluidized bed gasification process requires the attainment of appropriate fluidization conditions (gas velocities and solid particle properties), as well as appropriate temperatures for gasification. Operating the gasifier system at elevated pressure strongly impacts the heat transfer and fluidization properties of the system. For example, when operating at 300 psig, the gas throughput is approximately 20 times higher than at 15 psig. Consequently, the amount of oxygen that must be introduced into a high pressure gasifier is also increased, resulting in an even a greater rate of local heat release. This higher heat generation rate can result in local high temperatures that exceed the desired maximum, resulting in slagging or other undesirable impacts on fluidization. This is an even larger problem if biomass is fed to the gasifier since the temperature for slagging is lower than that for other feeds such as coal or pet coke. Consequently, most commercially available gasifier systems for biomass operate at low to modest pressures (<100 psig) in order to balance the fluidization and temperature requirements.

Slag formation must be avoided. Since the overall stoichiometry of the gasification stage and combustion stage are different (reducing vs. oxidizing, respectively), the stable form of the inorganic species can be different in each stage (e.g. carbonates vs. oxides) and will thus have different melting and softening temperatures. Because of these differences, it is possible to safely operate the combustion stage at a higher temperature than the gasification stage without forming slag. In addition, since the molar volume of the stable inorganic components from the gasifier and combustion stage will be necessarily different, cycling the ash between the combustor and gasifier will result in stress corrosion cracking of the ash down to very fine particles that can be elutriated with the syngas product and flue gas and collected downstream of the gasifier.

Gasification systems able to operate at elevated pressures (>200 psig) offer significant economic advantages over lower pressure systems, especially when the syngas product is utilized in producing chemicals or liquid transportation fuels. With a low pressure gasifier, syngas compression after the gasifier is necessary to achieve the >400 psig necessary to produce most chemical or transportation fuels through commercially established catalytic processes. The cost of compression can easily be >10% of the total plant capital and the energy expenditure can amount to 10 to 15% of the incoming feed. The fluidizing gas is selected from the group consisting of steam, carbon dioxide, air, nitrogen, natural gas, C1 to C4 hydrocarbons, recycle gas, syngas, and mixtures thereof. Steam is the preferred fluidizing gas. Since steam (produced at >300 psig) is the primary fluidizing gas, gasification at elevated pressures is far more economically viable than that of low pressure.

In addition to higher gas throughput, high pressure gasifiers require higher solids throughput as well. Most low pressure gasifiers utilize mechanical feeding systems, such as screw feeders, ram feeders, and conveyors. These systems typically have duty factors below 75%, requiring redundancy for reliable operation, and are best suited for low feed rate applications, making them poorly suited to feed high pressure gasifiers. These systems must also be isolated from the gasifier to prevent hot syngas from entering the feed system and reacting with the raw biomass which can cause the biomass to agglomerate and clog the feed system. This is typically accomplished either using expensive lock hopper systems to physically isolate the feed systems or purge gases which can result in unwanted diluents in the product gas.

The gasification process as applied to the conversion of carbonaceous materials actually involves a plurality of individual reactions associated with conversion of carbon, hydrogen, and oxygen into products involving steam, hydrogen, oxides or carbon, soot or tars and hydrocarbons. At elevated temperatures (>1000° F.) associated with gasification, the major products are typically steam, hydrogen, $CO_2$, CO and methane. Chars and soot represent the carbon-rich solids that can also contain small amounts (<5%) of hydrogen.

The gasification process is conducted at an effective gasification temperature. Such a temperature will be in the range of about 1000° F. to 1800° F., more preferably in the range of 1200° F. to 1800° F., and most preferably in the range of 1300° F. to 1700° F. and at pressures ranging from about 5 to about 50 atmospheres, preferably from about 10 to 40 atmospheres, and more preferably from about 20 to 30 atmospheres. Further, the gasification stage will be operated at net reducing conditions whereas the second, or combustion stage, is operated under net oxidizing conditions.

Substantially all reactions occur simultaneously within the gasification zone in the presence of oxygen. Since the gasification process is endothermic in nature, heat must be supplied in order to maintain the desired temperatures. Gasifiers can also be classified with respect to how they provide this heat. Indirect gasifiers utilize suitable heat transfer devices, preferably tubes located in the gasifier, which tubes are comprised of a metal alloy capable of withstanding the process temperatures of the gasifier. Typically, an external source of hot gas passes through the tubes to provide heat that is transferred to the gasification reaction zone within the reactor. The maximum operating temperature for these types of gasifiers is typically ≤1500° F. due to the material limitations associated with the heat transfer device used. Gasifiers designed to operate at high temperatures (≥1800° F.), such as those used for the gasification of coal, employ oxygen in the feed to provide the necessary thermal energy for driving the endothermic reactions through partial oxidation. This use of internally generated heat is referred to as a "direct" or "oxygen-blown" gasifier that can achieve substantially complete conversion of the feed carbon. It will be understood that the term "oxygen gas" when used herein is taken to mean an oxygen-containing gas, preferably an oxygen-rich gas having in excess of 50 vol. % oxygen, preferably at least 90 vol. %, more preferably at least 95 vol. %, most preferably at least about 99 vol. %. Substantially pure oxygen is also preferred. One preferred source of oxygen is from a pressure swing adsorption unit, which is well known in the art. Coal gasifiers (direct type) generally operate in what is referred as the slagging mode since the temperatures achieved within the partial oxidation zone is very high (>2000° F.) and when inorganic constituents of the feed undergo "fusion" or are at least partially vaporized or liquefied. The fused or liquefied inorganics are typically collected at the bottom of the gasifier and can be periodically or continuously drawn out of the system whereas the vaporized inorganics leave with the syngas. However, when this high temperature gasification technology is applied to biomass, problems arise because of the relatively high inorganic content of the biomass feed. Biomass typically contains higher concentrations of inorganic constituents that can vaporize at lower temperatures than those inorganic constituents found in coal and that can deposit on downstream equipment, causing fouling of heat transfer surfaces and resulting in operational problems.

A major problem associated with the use of partial oxidation (oxygen injection) as the heat source in biomass gasification involves the management of slag or the vaporization of inorganic constituents within the biomass. Due to the relatively low reactivity of coal towards gasification, commercial gasifiers are designed to operate at very high temperatures (>2200° F.), which would have the potential of vaporizing an undesirable amount of inorganic material of the biomass feed. Operating at lower temperatures would reduce the efficiency of coal gasification process.

To date, all commercial gasifier systems that employ oxygen to supply thermal energy through partial oxidation generate localized hot spots at the injection point. The reaction of oxygen in the gasification environment is very fast and for all practical purposes occurs within the jet volume associated with the oxygen injection nozzle. The jet of oxygen forms essentially a volume around the nozzle tip, which volume can be referred to as the partial oxidation, or pox, zone. Within this volume, localized temperatures (hot spots) can approach the adiabatic flame temperature determined by the combustion of the available oxygen and the local fuel, either a portion of the product synthesis gas or gaseous products of pyrolysis reactions. The endothermic reactions (gasification and pyrolysis) do not occur as fast as oxidation and consequently more chemical heat is generated than removed. One possible way to mitigate such higher temperatures is to transfer cooler solids and gas through the pox region. A fluidized bed reactor using inert solids provides geometry to mitigate the higher temperatures. Solids having catalytic properties will provide additional heat mitigation through the promotion of steam reforming of gaseous hydrocarbons produced through pyrolysis.

Another way to mitigate the high temperatures is to use pulsed oxygen-rich gas injection so as to keep the maximum, or peak, temperature within the oxygen injection region (also referred to as the flame, or pox, zone) below the fusion temperature of inorganics of the carbonaceous feed. This method for controlling temperature involves the controlled periodic injection of oxygen at a flow rate and frequency that prevents the attainment of temperatures at and exceeding the fusion temperature of inorganic constituents of the feed. Additionally, operating at temperatures below about 1800° F. reduces the extent of volatility of these constituents, thereby minimizing fouling of downstream equipment. Although it is preferred that oxygen be introduced with pulsing it is within the scope of this invention to inject a substantially continuous stream of oxygen at a rate and amount that will result in a the conversion of at least 70 vol. % of the organic fraction of the biomass feed.

The feed system of the gasifier of the present invention is preferably orientated to provide maximum contact of the carbonaceous material with oxygen, steam and other fluidizing gases within the fluid bed. The use of both steam and oxygen minimizes the extent of pyrolysis, however pyrolysis can still proceed to some extent resulting in the production of tars, soot and other carbon-rich solids that inherently gasify at a much slower rate than the parent carbonaceous feed, particularly a biomass feed. By "carbon-rich" we mean greater than about 50 wt. % carbon, preferably greater than about 60 wt. % carbon. When the feed is a biomass and if a subsequent combustion step is used, the heat required in the gasifier is significant since most of the biomass gasification and all of the pyrolysis occurs in the gasifier (endothermic reactions). The gasifier is preferably operated at a lower temperatures than a subsequent combustion zone 1200° F. to 1800° F. vs. 1400° F. to 2200° F. The product syngas from the gasification stage is passed downstream to further processing and the solids (tars and other carbon-rich solids) can be sent to a combustion stage which is operated at a higher temperature that the gasification stage in order to facilitate conversion of the tars and other carbon-rich solids. This higher temperature will be at least 50° F. greater, preferably at least about 100° F. greater than the first stage in order to reduce the potential for high temperatures within the pox zone. The upper temperature of this second stage is the point where an undesirable amount of slag, or fusion, of at least a fraction of the inorganic portion of the carbonaceous material occurs.

The fluidization conditions for the combustion stage includes a much higher fraction of inert solids and the desired temperature range is higher in order to facilitate combustion of the carbon-rich solids generated in the gasification stage. The total amount of oxygen introduced into the combustion stage gas is preferably sufficient to maintain the desired temperature and is introduced in a suitable manner to avoid excessive temperature stages that will lead to liquefaction, slagging, or fusion of the inorganic constituents of the solids. The temperature of the bed can be controlled by ensuring that there is always excess oxygen present in the bed such that decreasing the flow of the oxygen containing gas would result in a higher temperature and increasing the flow of oxygen containing gas would result in a lower temperature. This control allows the amount of heat delivered to the gasification stage to be controlled which allows for control of the overall heat balance of the gasifier. The depth and diameter of fluid bed is determined by several criteria, including:

Minimum fluidization velocity to maintain fluidization within the bed

Achieving sufficient residence time to gasify a high fraction of the carbon containing solids transferred to the combustion stage.

Introducing an oxygen containing gas over a sufficient area and volume to minimize and local hot spots that would lead to slagging of inorganic components.

The products from the gasifier include tars and other carbon rich intermediates arising from pyrolysis as well unreached biomass. The gas phase contains $H_2$ and $CO$ (syngas) as well as $CO_2$, $H_2O$, $CH_4$ and other hydrocarbons arising from the pyrolysis reactions.

Figure 1:
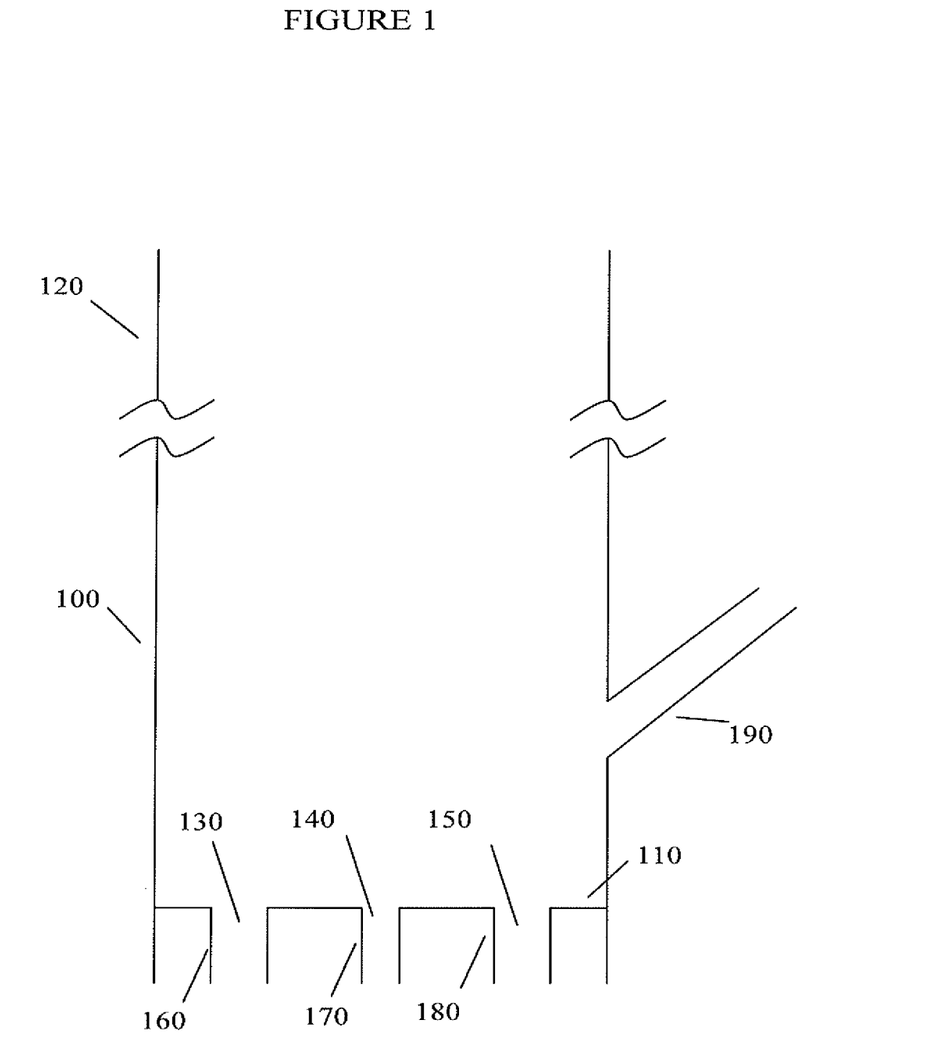
FIG. 1 is a simplified drawing of a typical section of a gasifier showing one preferred nozzle arrangement wherein fluidizing gas and oxygen for pulsing will be introduced.

The current invention will be better understood with reference to the figures here. FIG. 1 hereof represents the basic form of the present invention as applied to any gasifier system in which a fluidizing gas and a gas containing an oxygen-containing gas is injected. The nozzles introducing the fluidizing gas (preferably steam) and the oxygen-containing gas are spaced in accordance to that required to secure the appropriate fluidization within the gasification zone. The nozzles are referred to the conduits in which gas is transferred into the gasifier stage in such a manner so as to adequately fluidize the carbonaceous and inert particles. The conduits in which fluidizing gas are conveyed to each gasifier stage is referred to as nozzles. However, the gas injection geometry can also include any device which adequately conveys the fluidizing gas into the gasifier stage in such a manner which provides acceptable fluidization. For one skilled in the art there are several geometries which can be utilized such as bubble caps.

FIG. 1 hereof, represents the section of the gasifier in which fluidizing gas is introduced showing a pressure containing boundary 100 which originates at the plane in which gas is introduced 110 defining the bottom of the gasification zone, to the upper portions of the fluidized bed 120. In this figure, the nozzles 130, 140 and 150 which introduce a fluidization gas and represent a subset of the required plurality of nozzles fluidization. For simplicity, they are shown to be on a single plane but variations in height above the bottom 110 of the gasification zone can also be utilized. The conduits required for transferring the fluidization gas from the source to the gasification zone are denoted as 160, 170 and 180. There can be a conduit for each nozzle or multiple nozzles can be connected in one or more fluidizing gas conduits. The conduit for the introducing solids into the gasifier stage is shown as 190. This can be one or more conduits and is not significant with respect to this invention. Conduit 190 that conveys solids into the gasifier and which can encompass feed for gasification or partially reacted feed containing char, carbon and/or soot that will undergo either additional gasification, partial oxidation, or complete oxidation, depending upon the nature of the gasification stage. In the majority of applications, inert solids used to promote fluidization and heat transfer can also be conveyed through 190.

Figure 2:
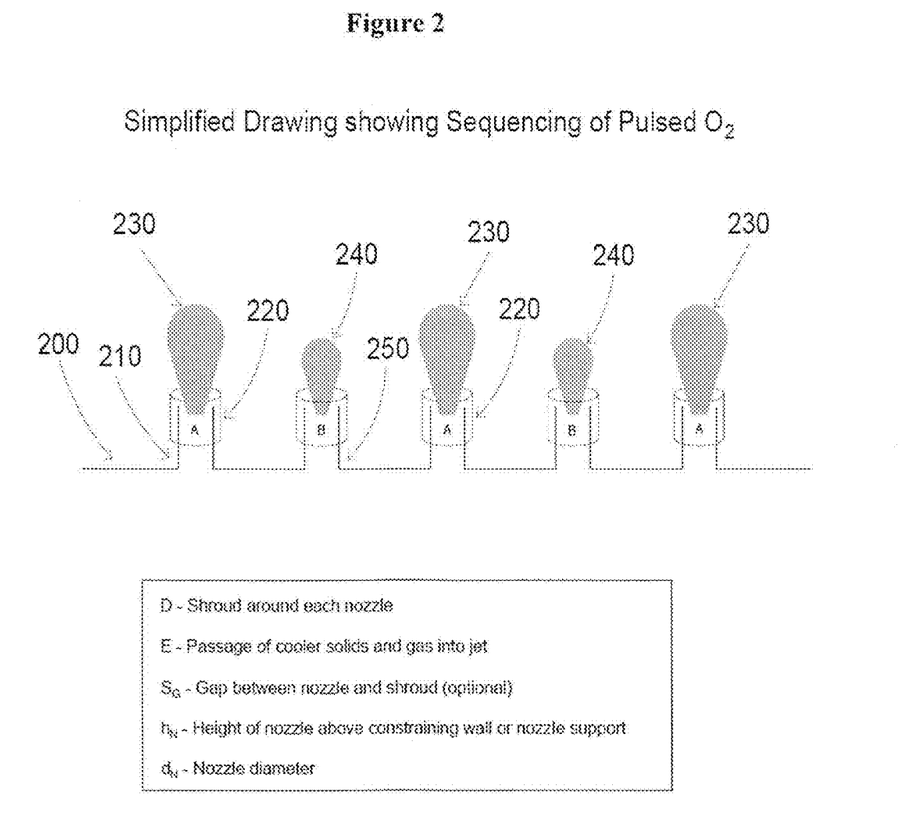
FIG. 2 hereof is a representation of a preferred embodiment of the oxygen injection sequence utilizing two sets of nozzles.

FIG. 2 hereof presents a simplified drawing of one preferred pulsed $O_2$ sequence. In this example the nozzles conveying the fluidizing gas are shown on a single plane 200. Each nozzle 210 and 250 is of an appropriate diameter and geometry to convey an effective amount of fluidizing gas over a cross section of the gasification zone. A shroud 220 can be part of the nozzle geometry in order to facilitate the entrainment of the bulk fluidized gas and solids into the volume of the jet, or bubble, associated with the fluidization gas 230 and 240. When periodically introducing oxygen into the fluidization gas, there will be a local increase in temperature within the gas volume associated with the jet of oxygen-containing gas. This jet can also be considered a bubble forming at the exit of the nozzle and extending into the fluidized bed. As the $O_2$ flow is cycled from zero flow to some maximum and then decreased back to zero, the jet containing the $O_2$ increases from zero to some maximum and then back to zero. The case of zero $O_2$ flow is not shown in FIG. 2 hereof. Within this jet volume a local temperature rise will occur due to the relatively high oxidation rate compared to the gasification reaction. The temperature rise will dependent upon the volume of the $O_2$ introduced during the pulsed $O_2$ time period.

Figure 3:
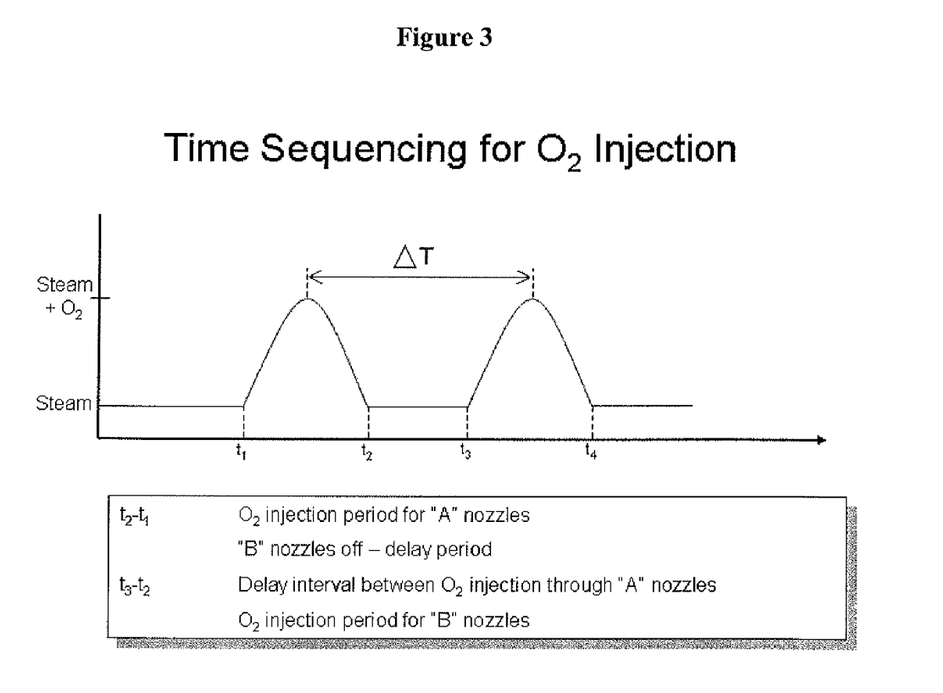
FIG. 3 hereof is a simplified drawing showing what applicants believe to be the sequencing of pulsed oxygen into the gasification reactor of the present invention.

FIG. 3 presents a qualitative plot of an $O_2$ injection rate. The amount of $O_2$ introduced during each pulse cycle will establish the maximum temperature rise within the jet. The volume of $O_2$ introduced in each pulse is established by integrating the flow rate over the characteristic time period $(t_2-t_1)$ and the interval between pulses is designated by $(t_3-t_2)$. FIG. 3 refers to two classes of nozzles with "A" and "B" designations. This is a simple example in which adjacent nozzles (A and B) alternate pulsing in order to avoid a local high concentration of $O_2$ which can lead to a high local temperature. Although only two sets of nozzles are shown in FIG. 2 hereof it will be understood that any number of sets of nozzles can be used within practical limits. Also, any cycle sequence can be used to achieve the desired oxygen duty within the gasification zone. Further, although it may be preferred to stop gas from injecting into the gasification zone through any given set of nozzles it will be understood that a reduced flow of oxygen-containing gas can be made to flow through any one or more sets of nozzle during any cycle sequence. Steam or another gas (syngas, $N_2$, $CO_2$ can also be used during the interval when $O_2$ is not being injected at the maximum rate.

The application of the present invention involves estimating the local temperature rise of the jet during the time period in which oxygen is introduced. Before determining the $O_2$ pulsation frequency and flow rate one must first establish the nozzle design required to achieve acceptable fluidization. This is relatively straight forward to one skilled in the art and involves establishing the fluidization properties for the feed, reaction intermediates, and inert solids in the fluidized bed. Once established, a heat balance over the various stages of the gasifier system is required to determine how much oxygen needs to be introduced into the gasification zone. This is again straight forward to one skilled in the art of fluidized beds. The amount of oxygen to be introduced into each stage can then be distributed over the nozzle geometry established for fluidization. One then determines if this oxygen requirement can be introduced over one or more subsets of nozzles, recognizing that the jet, or bubble, detachment from fundamental principles follows the relationship:

$$1/t_{detach} \text{ proportional to } (g/Q)^{1/5}$$

where $t_{detach}$, is the time frame in which gas that enters through the nozzle detaches and enters the fluidized bed, g is the gravitational constant, and Q is the flow rate. The detachment frequency is relatively insensitive to the total flow rate Q and in the application of this invention the total flow rate through each nozzle is not a significant consideration. The pulsing frequency ($t_3$-$t_2$) for $O_2$ must be less than this characteristic frequency which can be determined empirically or through direct measurement.

The temperature rise within a jet is dependent on the flow rate of $O_2$ and the rate of local entrainment of solids and gas within each nozzle. Entrainment rates for specific nozzles must be empirically established since it is highly dependent upon the local geometry and local solids concentration. Empirical correlations exist that allow one to estimate solids flux into a jet and from these estimates a local temperature rise within the jet can be established from the amount of oxygen which must be introduced into each nozzle. The invention requires that the local temperature rise based on the estimated entrainment of the bulk fluidization material not exceed the desired maximum operating temperature determined by the softening or melting temperature of inorganic components of the feed, particularly if the feed is a biomass (in the range of about 1600° F. to 2000° F.). If this is the case, then the nozzle geometry for the fluidizing gas must be modified to allow less oxygen injection per nozzle. This modification can involve the use of smaller nozzle diameters, solids distribution elements in the feed conduit(s) (190 in FIG. 1 hereof) or the use of entrainment devices (such as shrouds) to facilitate entrainment.

Once the local temperature rise for the appropriate amount of $O_2$ to be introduced to each gasifier section is found to be acceptable, the required pulse frequency can be established for a specific gasifier section. In the case where local temperature are excessive in a specific gasifier section, it is possible to find other sections of the gasifier system where $O_2$ can be introduced without exceeding the maximum desired temperature.

Returning again to FIG. 3 which presents a simplified drawing of the use of pulsed $O_2$. At the onset of the pulse, the pox zone for each nozzle is relatively small with only a modest increase in temperature. As time elapses, the incoming oxygen allows the pox zone to fully develop leading to a larger volume and higher temperatures within the zone. During this period of development, the temperature within the pox zone is increasing due to a combination of increasing oxygen flow and a decrease in the surface area to volume ratio. The duration of the pulse must be less than the time required to fully develop the pox zone. This time is approximated by the velocity of the incoming oxygen jet over the length of the penetration of the jet. The velocity is determined by the flow rate and the $O_2$ nozzle diameter while the jet penetration is established using existing correlations available in the literature and/or detailed momentum modeling (using computational fluid dynamics). The temperature within the pox zone during the pulsing period is determined by use of a heat balance relating the energy being released through pox and the cooling occurring due to the flux of cooler solids and gases passing through the pox zone. The heat balance can be solved within the boundaries defined by the extent of mass flux and the amount of endothermic reactions occurring within the pox zone. Using these boundaries, one can establish a temperature rise which is below the fusion and/or vapor pressure limit of the inorganic constituents within the biomass feed.

In the case where the local temperature is excessive in a specific gasifier section, it is possible to employ other sections of the gasifier system where $O_2$ can be introduced without exceeding the local maximum desired temperature.

What is claimed is:

1. A method for controlling the temperature of a gasification zone having a top section and a bottom section and which is designed for converting carbonaceous materials, having an inorganic fraction and an organic fraction, to a syngas:
   a) maintaining a fluidized bed of solids in said gasification zone by use of a fluidizing gas introduced through a plurality of nozzles located at the bottom section of said gasification zone wherein said nozzles having a partial oxidation zone and wherein said gasification zone is operated under net reducing conditions;
   b) maintaining said fluidized bed at effective gasification temperatures;
   c) pulsing oxygen, through one or more of said plurality of nozzles at effective pulsing conditions to maintain the partial oxidation zone of said nozzles below the fusion temperature of at least a fraction of said inorganic fraction of said carbonaceous material.

2. The process of claim 1 wherein the fluidizing gas is selected from the group consisting of steam, carbon dioxide, air, nitrogen, natural gas, C1 to C4 hydrocarbons, recycle gas, syngas and mixtures thereof.

3. The process of claim 2 wherein the fluidizing gas is steam.

4. The process of claim 1 wherein the carbonaceous material is a biomass.

5. The process of claim 4 wherein the biomass material is reduced in size to an average particle size up to about 3 inches, then subjected to torrefaction at a temperature from about 390° F. to about 665° F. then further reduced in size to about 1 micron to about 500 microns prior to being introduced to the gasification stage.

6. The process of claim 4 wherein the biomass material is a lignocellulose material comprised of at least about 50 wt. % cellulose, hemicelluloses, or both.

7. The process of claim 6 wherein the biomass material is comprised of at least about 20 wt. % cellulose, hemicellulose, or both.

8. The process of claim 1 wherein the biomass material is dried then reduced to an average particle size from about 1 micron to about 500 microns.

9. The process of claim 8 wherein the biomass is reduced in size to an average particle size of about 150 microns to about 300 microns.

* * * * *